United States Patent [19]
Hanada

[11] Patent Number: 6,000,864
[45] Date of Patent: Dec. 14, 1999

[54] PRINT CONTROL METHOD AND PRINTING SYSTEM IN WHICH PRINTER PRELIMINARY NOTIFIES PERIOD OF TIME IT TAKES BEFORE IT BECOMES READY TO RECEIVE PRINT DATA

[75] Inventor: Keitaro Hanada, Soraku-gun, Japan

[73] Assignee: Sharp Kabushiki Kaisha, Osaka, Japan

[21] Appl. No.: 09/149,970

[22] Filed: Sep. 9, 1998

[30] Foreign Application Priority Data

Sep. 11, 1997 [JP] Japan .................................. 9-246636

[51] Int. Cl.⁶ ........................................................ B41J 5/30
[52] U.S. Cl. .................................. 400/62; 400/71; 400/76
[58] Field of Search ................................ 400/76, 62, 71; 395/296

[56] References Cited

U.S. PATENT DOCUMENTS

| | | | |
|---|---|---|---|
| 5,138,561 | 8/1992 | Crowe | 395/103 |
| 5,274,461 | 12/1993 | Mitsuhashi | 358/296 |
| 5,293,463 | 3/1994 | Masuda | 395/101 |
| 5,473,741 | 12/1995 | Neufelder et al. | 395/137 |
| 5,768,633 | 6/1998 | Allen et al. | 396/2 |
| 5,845,165 | 12/1998 | McMahan | 396/426 |
| 5,864,651 | 1/1999 | Lavie et al. | 395/114 |

FOREIGN PATENT DOCUMENTS 9-93672  4/1997  Japan .

*Primary Examiner*—Ren Yan
*Assistant Examiner*—Charles H. Nolan, Jr.
*Attorney, Agent, or Firm*—David G. Conlin; Richard E. Gamache

[57] ABSTRACT

A print control method capable of reducing power consumption of an information apparatus is performed between the information apparatus for transmitting print data and a printer receiving the print data for image forming in accordance with the print data which are connected by wireless communication. The print control method includes the steps of: calculating a first period of time it takes before it becomes ready to receive the print data by the printer; notifying the information apparatus of the first period of time by the printer; determining if the first period of time is elapsed by the information apparatus; and transmitting the print data to the printer by the information apparatus when the first period of time is elapsed. It is noted that a printing system using the print control method is also claimed.

24 Claims, 12 Drawing Sheets

RADIOCOMMUNICATION PROCEDURES

FIG.11

| APPARATUS IDENTIFIER | STATUS | CONNECTION INFORMATION | PRINTOUT DATA IMFORMATION |
|---|---|---|---|
| DSC1 | PRINTING | 115Kbps | SVGA,FINE 256COLORS |
| DSC3 | STANDING-BY | 115Kbps | SVGA,NORMAL 1,600MILLION COLORS |
| DSC4 | STANDING-BY | 4Mbps | VGA,FINE 1,600MILLION COLORS |

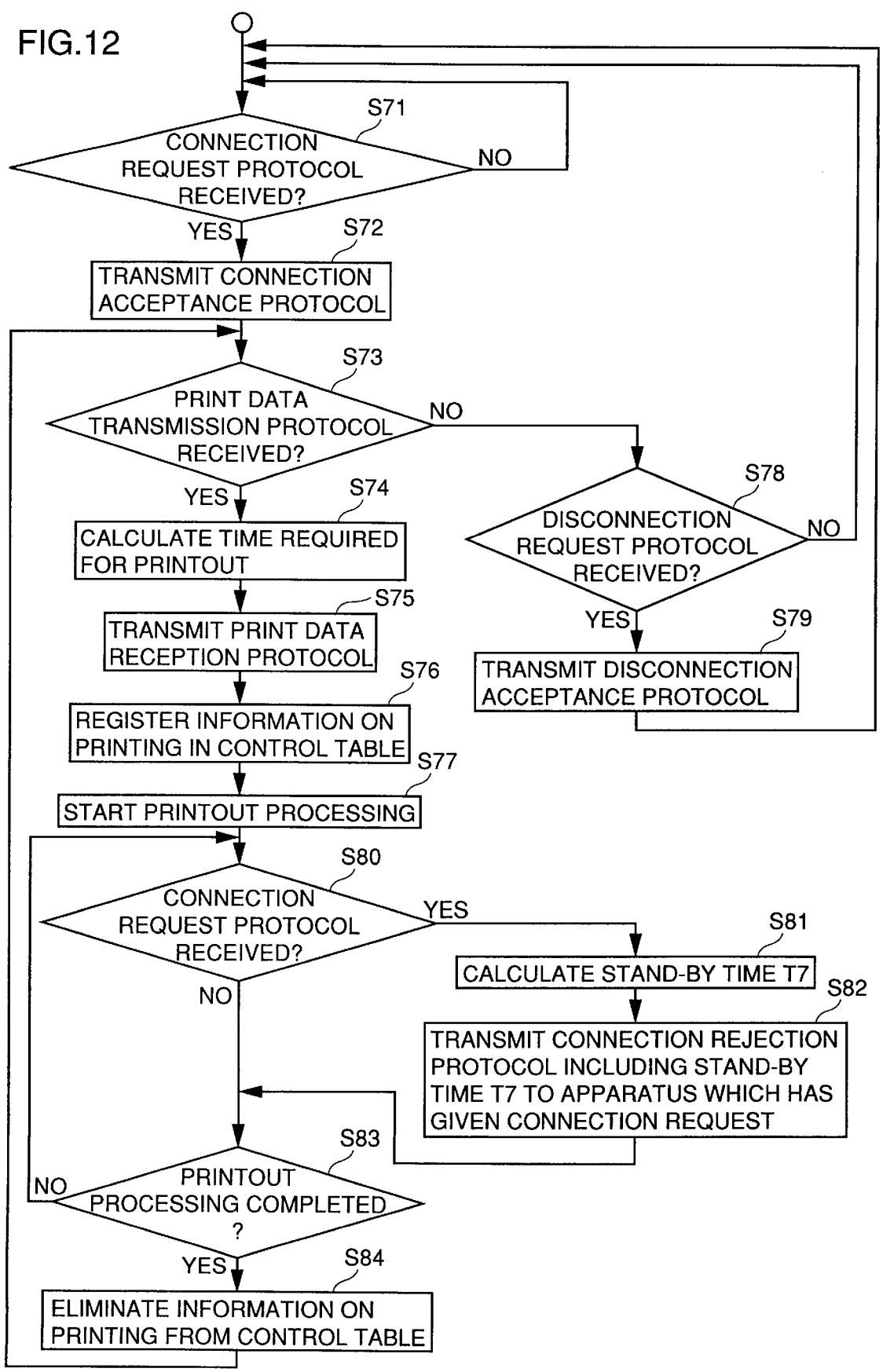

PRINT CONTROL METHOD AND PRINTING SYSTEM IN WHICH PRINTER PRELIMINARY NOTIFIES PERIOD OF TIME IT TAKES BEFORE IT BECOMES READY TO RECEIVE PRINT DATA

BACKGROUND OF THE INVENTION

1. Field of the Invention

The present invention relates to a print control method and a printing system in a system connecting an information apparatus such as a computer and a printer by wireless communication using electromagnetic wave or light as a medium. The present invention relates more particularly to a print control method and a printing system in which a printer preliminary notifies a period of time it takes before it becomes ready to receive print data.

2. Description of the Background Art

A conventional output unit such as a printer is connected to an information apparatus such as a computer by a signal cable. However, the laying of the signal cable is in some cases difficult. In such case, if the connection is made by radiocommunication, the output unit and the information apparatus can be provided remote from each other, or one printer can be shared by a plurality of computers. In addition, a portable apparatus including an electronic organizer, a portable information terminal or a digital camera is in most cases not connected to a network. Radiocommunication allows such portable apparatus to transfer data to a printer without any cable connection.

The portable apparatus is required to reduce its power consumption. When the network connection is achieved by radiocommunication, communication time must extremely be reduced. When the portable apparatus uses a printer, the portable apparatus must inquire if the printer is presently ready to use. The radiocommunication required for the inquiry must be reduced to save electric power.

In a usual printer, data to be output is temporarily stored for subsequent processing. However, in a printer processing data with a large amount of information such as a color printer, generally, data corresponding to one page is received at a time and next data cannot be received until printout of the data is completed. When a plurality of pages are sequentially output from such printer, the portable apparatus must detect completion of the processing of the currently processed page and then transfer data corresponding to a next page. In addition, when the printer is in the process of printout by a request from another apparatus, the portable apparatus must detect completion of the processing and again give the printer a request for printout.

The following method is widely used to solve this problem. More specifically, a printer which has received a request for printout from an information apparatus notifies the information apparatus of completion of printout processing when the printout processing for another apparatus is completed. Further, when the printer receives a request for printout in the process of printout, the printer registers an identifier indicating that information apparatus which gave the request in a queue. When a current printout is completed, the printer notifies the information apparatus which is registered in the first place of the queue that printout is possible. At the same time, the printer eliminates the identifier of the notified information apparatus from the queue. By using this method, the printer can successively print out a plurality of pages. In addition, the printer can automatically process requests for printout transmitted from a plurality of information apparatuses sequentially.

In a system disclosed in Japanese Patent Laying-Open No. 9-93672, when radiocommunication is possible between an information apparatus and a printer, the information apparatus inquires the printer at regular intervals. In addition, the information apparatus always diplays a status of the printer on its screen in the form of icon. Thus, information on the current status of the printer and completion of printout processing is available to a user.

In the former method, however, the information apparatus must always be maintained in a status of a radiocommunication until printout is completed. Electric power is consumed therefor, thereby preventing reduction in electric power. Further, when the information apparatus fails to receive a signal indicating completion of the processing from the printer for transient accident, the information apparatus would continue to wait for the signal indicating the completion of the processing in a status of reception.

In the latter method, although the information apparatus transmits data at regular intervals, generally, much larger amount of electric power is consumed at the time of transmission than reception. Thus, reduction in interval for inquiry increases electric power consumption. On the other hand, if the interval for inquiry is increased, a period of time from completion of printout processing to next inquiry is also increased. This results in another problem of wasting time. Therefore, in a conventional method, for successive printout, the information apparatus must maintain the status of reception or frequently inquire the printer. Thus, power consumption on the side of the information apparatus cannot be reduced. On the other hand, if the power consumption on the side of the information apparatus is to be reduced, the information apparatus must increase the interval for inquiry with respect to the printer, making it difficult to successively print out from the printer. Therefore, it is difficult to solve both problems at the same time.

SUMMARY OF THE INVENTION

The present invention is made to solve the above mentioned problem. It is an object of the present invention to provide a print control method and a printing system capable of reducing power consumption on the side of an information apparatus and allowing successive printout.

It is another object of the present invention to provide a print control method and a printing system capable of reducing power consumption on the side of an information apparatus and allowing successive printout when a plurality of information apparatuses are connected to one printer.

It is still another object of the present invention to provide a print control method and a printing system capable of reducing power consumption on the side of an information apparatus and allowing successive printout when three or more information apparatuses are connected to one printer.

A print control method according to one aspect of the present invention is performed between an information apparatus transferring print data and a printer receiving the print data for image forming in accordance with the print data, which are connected by radiocommunication. The above mentioned print control method includes the steps of: calculating a first period of time it takes before it becomes ready to receive print data by the printer; notifying the information apparatus of the first period of time by the printer; determining if the first period of time is elapsed by the information apparatus; and transmitting the print data to the printer by the information apparatus when the first period of time is elapsed.

The printer calculates the first period of time it takes before it becomes ready to receive the print data for notifying the information apparatus of it. The information apparatus transmits the print data to the printer when the first period of time is elapsed. Thus, the information apparatus needs not be kept in a status of reception or transmit data for inquiry so as to inquire about a status of the printer. Consequently, the information apparatus can automatically transmit a plurality of data successively, thereby reducing power consumption.

Preferably, the step of calculating the first period of time includes a step of calculating a period of time it takes before image formation for print data which is currently in the process of image formation is completed.

The printer calculates a period of time it takes before the currently processed image formation is completed for notifying the information apparatus of it. When the period of time is elapsed, the information apparatus transmits print data to the printer. Thus, even when a plurality of information apparatuses inquire about the status of the printer, each of the information apparatuses needs not be kept in the status of reception or transmit data for inquiry. Accordingly, the information apparatus can automatically transmit a plurality of data successively, thereby reducing power consumption.

More preferably, the print control method further includes a step of storing by the printer information on print data for which image formation has not been completed from print data received by the information apparatus. In addition, the step of calculating the first period of time includes a step of calculating a period of time it takes before image formation for all of print data for which image formation has not been completed is completed in accordance with information on print data for which image formation has not been completed.

The printer calculates a period of time it takes before all of the currently processed image formation and that in a stand-by status are completed for notifying the information apparatus of it. The information apparatus transmits print data to the printer when the period of time is elapsed. Thus, even when three or more information apparatuses inquire about the status of the printer, each information apparatus needs not be kept in the status of reception or transmit data for inquiry. Therefore, the information apparatus can automatically transmit a plurality of data successively, thereby reducing power consumption.

A printing system according to still another aspect of the present invention includes an information apparatus for transferring print data by radiocommunication, and a printer receiving the print data by radiocommunication for image formation in accordance with print data. The printer includes a time calculating portion for calculating a first period of time it takes before it becomes ready to receive print data, and a circuit for notifying the information apparatus of the first period of time. The information apparatus includes a circuit for determining if the first period of time is elapsed, and a circuit for transmitting print data to the printer when the first period of time is elapsed.

The printer calculates the first period of time it takes before it becomes ready to receive print data for notifying the information apparatus of it. The information apparatus transmits print data to the printer when the first period of time is elapsed. Thus, the information apparatus needs not be kept in the status of reception for inquiring about the status of the printer or transmit data for inquiry. Accordingly, the information apparatus can automatically transmit a plurality of data successively, thereby reducing power consumption.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 a diagram exemplifying a data structure of a control table for storing information on digital still cameras 1, 3 and 4 which have given printout requests in accordance with the third embodiment of the present invention.

FIG. 12 is a flow chart corresponding to a portion related to radiocommunication in a program for controlling printer 2 in accordance with the third embodiment of the present invention.

DESCRIPTION OF THE PREFERRED EMBODIMENTS

First Embodiment

Figure 1:
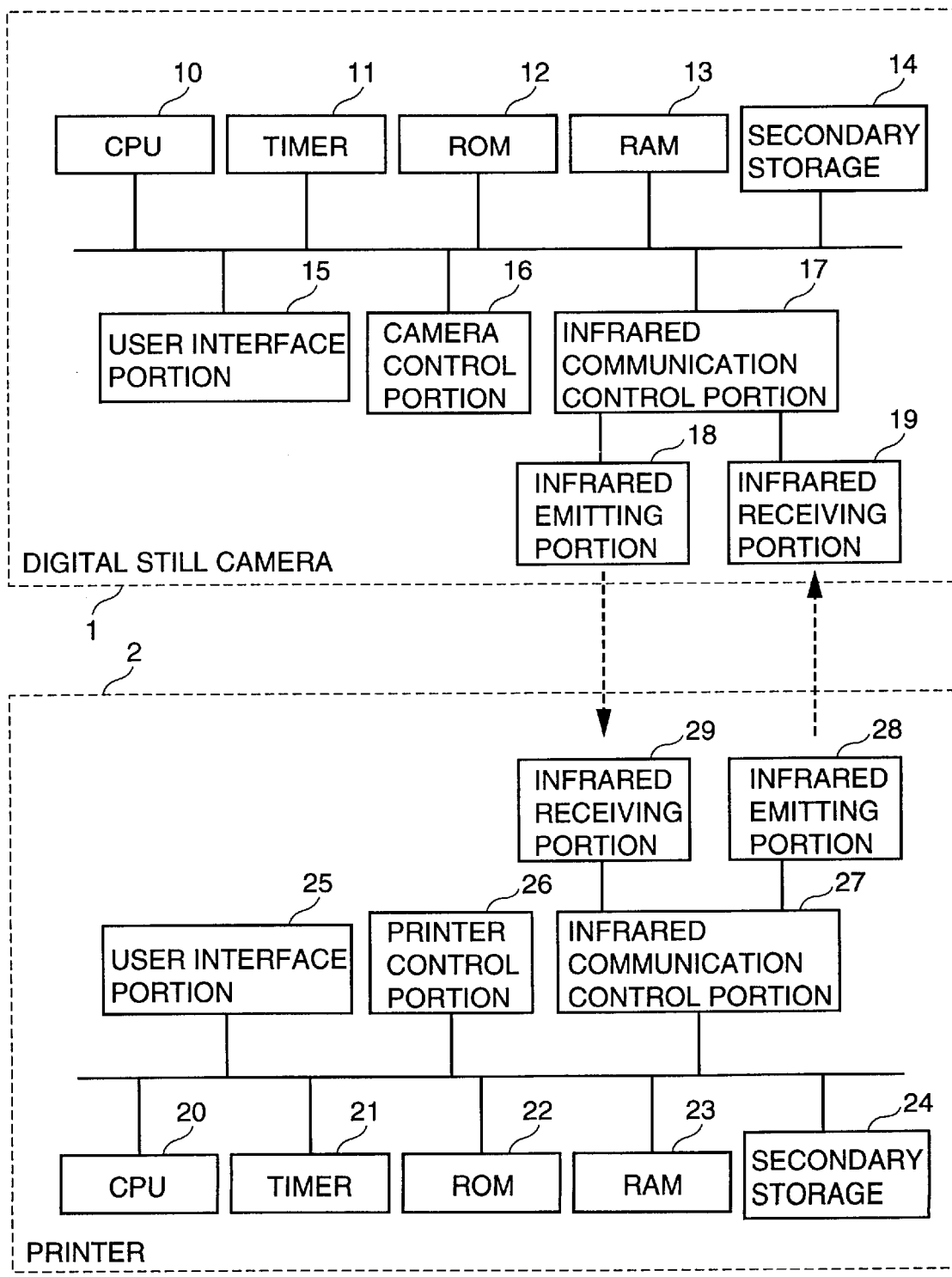
FIG. 1 is a block diagram showing a printing system in accordance with first to third embodiments of the present invention.

Referring to FIG. 1, a printing system in accordance with a first embodiment includes a digital still camera 1 and a printer 2 each provided with a wireless communication function including an infrared communication function and a radiocommunication function.

Digital still camera 1 includes: a CPU (Central Processing Unit) 10 generally controlling digital still camera 1; a timer 11 having a function of notifying an elapse of time; an ROM (Read Only Memory) 12 storing a program to be executed in CPU 10; an RAM (Random Access Memory) 13 storing data to be used in CPU 10; a secondary storage 14 storing picked up image data; a user interface portion 15 performing recognition processing of an operation by a user, image display or the like; a camera control portion 16 performing control of an image pickup device, image processing or the like; a wireless communication control portion 17 producing a protocol for wireless communication and performing data modulation/demodulation; a wireless communication emitting portion 18 emitting a signal for data transmission; and a wireless communication receiving portion 19 receiving a signal for data reception.

Printer 2 includes: a CPU 20 generally controlling printer 2; a timer 21 having a function of notifying an elapse of time; an ROM 22 in which a program to be executed in CPU 20 is stored; an RAM 23 storing data to be used in CPU 20; a secondary storage 24 storing data to be printed out or font data; a user interface portion 25 performing recognition processing of an operation by a user, display of a printing status or the like; a printer control portion 26 controlling a printer head, a paper feeding device or the like; a wireless communication control portion 27 producing a protocol for wireless communication and performing data modulation/demodulation; a wireless communication emitting portion 28 emitting a signal for data transmission; and a wireless communication receiving portion 29 receiving a signal for data reception.

In the following description, assume that each of RAM 23 and secondary storage 24 of printer 2 is provided with a capacity only required for processing data corresponding to one page at a time.

Figure 2:
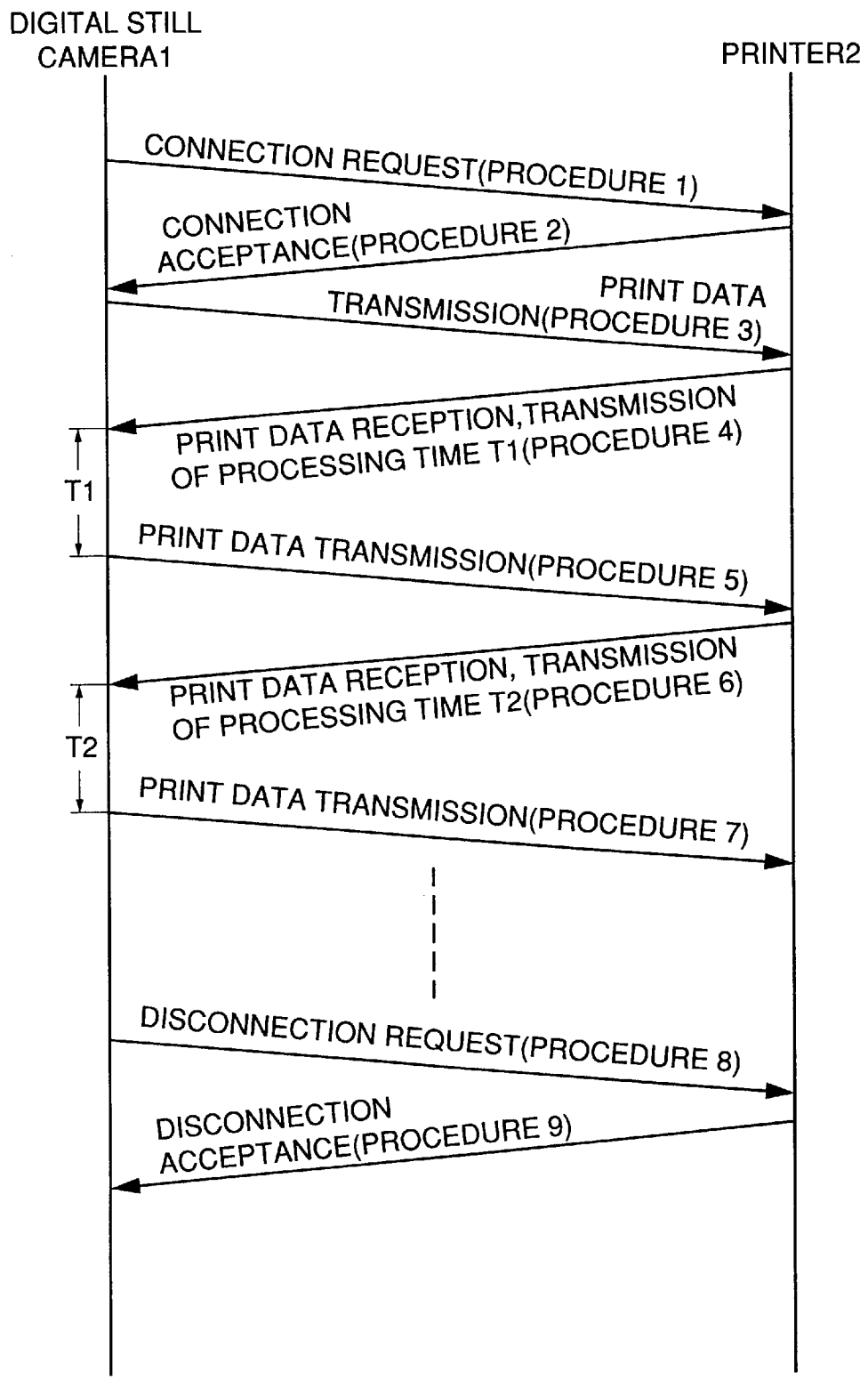
FIG. 2 is a diagram showing a procedure of radiocommunication in accordance with the first embodiment of the present invention.

Referring to FIG. 2, a procedure for radiocommunication when a request of printing out a plurality of pages is given to printer 2 from digital still camera 1 will be described.

First, digital still camera 1 transmits a connection request protocol to printer 2 (procedure 1).

If printer 2 is ready to process, printer 2 transmits a connection acceptance protocol to digital still camera 1 (procedure 2). Each of connection request and acceptance protocols is provided with information on a communication speed, communication buffer size, image size, paper size, the number of colors or the like corresponding to the processing of each apparatus. When procedure 2 is completed, these parameters are determined for the future communication between printer 2 and digital still camera 1.

When the connection between digital still camera 1 and printer 2 is established, digital still camera 1 transmits data corresponding to the first page as a print data transmission protocol to printer 2 (procedure 3).

When printer 2 receives all data correctly, it calculates a time T1 required for printout in accordance with the communication speed and output paper size or the like included in the connection request protocol and with the size and the number of colors of the printout data or the like included in the print data transmission protocol. Printer 2 additionally stores a value of time T1 in a print data reception protocol for transmitting it to the digital still camera (procedure 4).

Then, printer 2 starts printout processing. Digital still camera 1 which has received the print data reception protocol transmits data corresponding to a next page to printer 2 as in procedure 3 when time T1 is elapsed (procedure 5).

Thereafter, the processing similar to procedures 3 and 4 is sequentially repeated for every page which should be printed out (procedures 6, 7).

When print data corresponding to the last page is transmitted, digital still camera 1 transmits a disconnection request protocol to printer 2 (procedure 8).

Responsively, printer 2 transmits a disconnection acceptance protocol to end communication therebetween (procedure 9).

Figure 3:
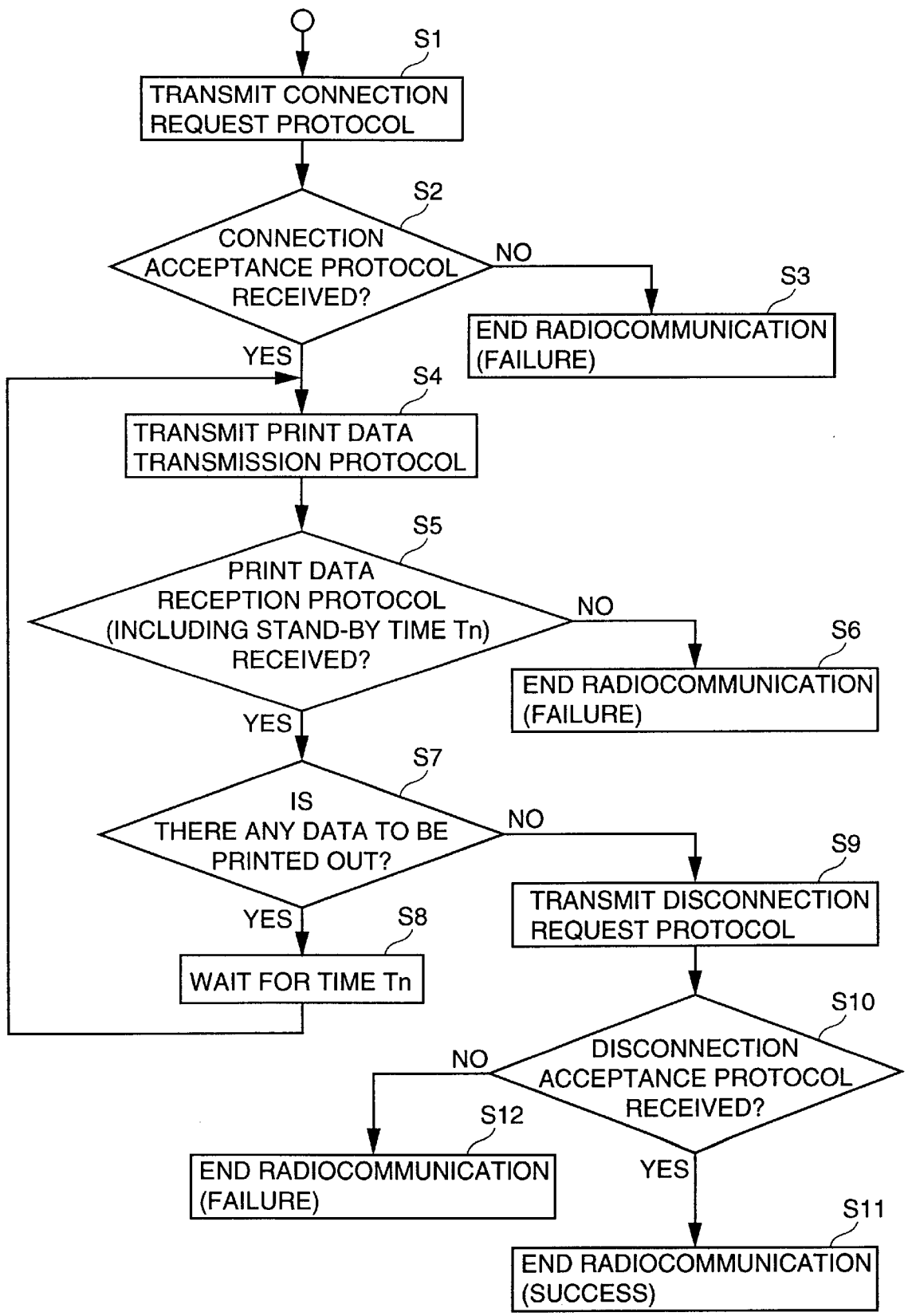
FIG. 3 is a flow chart corresponding to a portion related to radiocommunication in a program for controlling a digital still camera 1 in accordance with the first embodiment of the present invention.

Referring to FIG. 3, a portion related to radiocommunication in a program for controlling digital still camera 1 will be described.

Digital still camera 1 transmits the connection request protocol to printer 2 (S1). Digital still camera 1 determines if a connection acceptance protocol has been received (S2). If data other than the connection acceptance protocol has been received or no data has been received for a prescribed period of time (NO in S2), digital still camera 1 notifies a user of the failure of connection through user interface 15 and ends radiocommunication (S3). If the connection acceptance protocol has been received (YES in S2), digital still camera 1 transmits data corresponding to the first page as the print data transmission protocol to printer 2 (S4).

Digital still camera 1 determines if the print data reception protocol has been received (S5). If data other than the print data reception protocol has been received or no data has been received for a prescribed period of time (NO in S5), digital still camera 1 notifies the user of the failure of transmission of the print data through user interface portion 15 and ends radiocommunication (S6). If the print data reception protocol has been received (YES in S5), digital still camera 1 determines if there is any data to be printed out (S7).

If there is data to be printed out (YES in S7), digital still camera 1 returns to S4 after a stand-by time Tn which is included in the print data reception protocol received in S5 is elapsed (S8).

If all data have been transmitted (NO in S7), digital still camera 1 transmits the disconnection request protocol to printer 2 (S9). Digital still camera 1 determines if the disconnection acceptance protocol has been received by printer 2 (S10). If the disconnection acceptance protocol has been received (YES in S10), digital still camera 1 notifies the user of the success of transmission of every data and disconnection processing through user interface portion 15 and ends radiocommunication (S11). If data other than the disconnection acceptance protocol has been received or no data has been received for a prescribed period of time (NO in S10), digital still camera 1 notifies the user of the failure of disconnection processing through user interface portion 15 and ends radiocommunication (S12). Through the procedures hereinbefore, digital still camera 1 can transmit data corresponding to a plurality of pages sequentially. In addition, as digital still camera 1 needs not inquire frequently, reduction in power consumption is achieved.

Figure 4:
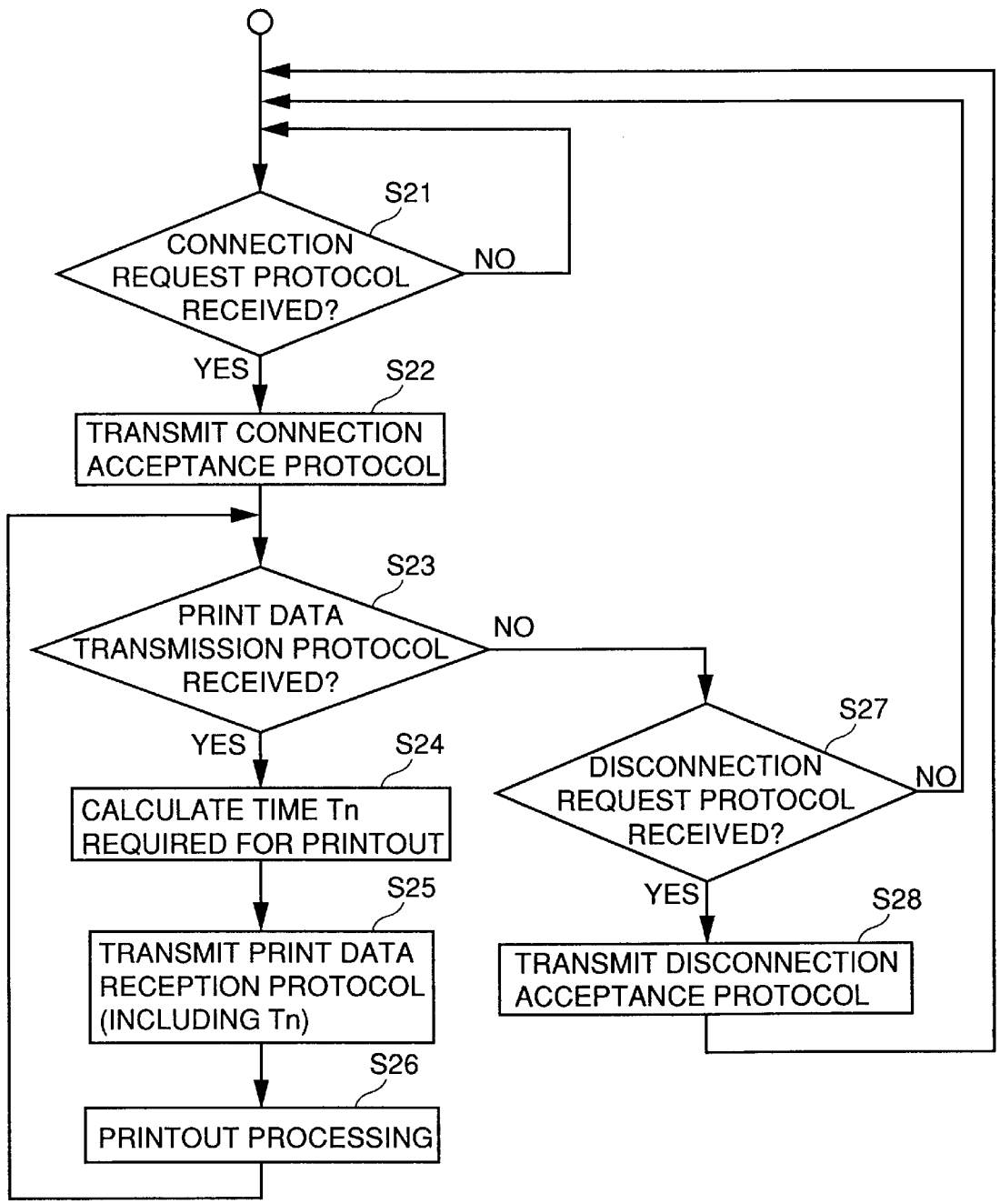
FIG. 4 is a flow chart corresponding to a portion related to radiocommunication in a program for controlling a printer 2 in accordance with the first embodiment of the present invention.

Referring to FIG. 4, a portion related to radiocommunication in a program for controlling printer 2 will be described.

Printer 2 determines if the connection request protocol has been received (S21). If data other than the connection request protocol has been received or no data has been received (NO in S21), printer 2 returns again to S21 and waits until the connection request protocol is received.

If the connection request protocol has been received (YES in S21), printer 2 transmits the connection acceptance protocol to digital still camera 1 (S22). Printer 2 receives data and determines if the received data is the print data transmission protocol or not (S23). If the received data is the print data transmission protocol (YES in S23), printer 2 calculates time Tn required for printing out the received data (S24).

Printer 2 transmits the print data reception protocol to digital still camera 1 (S25). At the time, a value of time Tn is included in the print data reception protocol. Printer 2 performs printout processing of the received data (S26), and then returns to S23.

If data other than the print data transmission protocol has been received (NO in S23), printer 2 determines if the data is the disconnection request protocol (S27). If the received data is the disconnection request protocol (YES in S27), printer 2 transmits the disconnection acceptance protocol to digital still camera 1 (S28) and returns to S21. If the received data is data other than the disconnection request protocol (NO in S27), printer 2 returns to S21.

By using the printing system according to the present embodiment, digital still camera 1 can automatically transmit a plurality of data successively without being kept in the status of reception for inquiring about the status of printer 2 or transmit data for inquiry. Thus, reduction in power consumption of digital still camera 1 is achieved.

Second Embodiment

Figure 5:
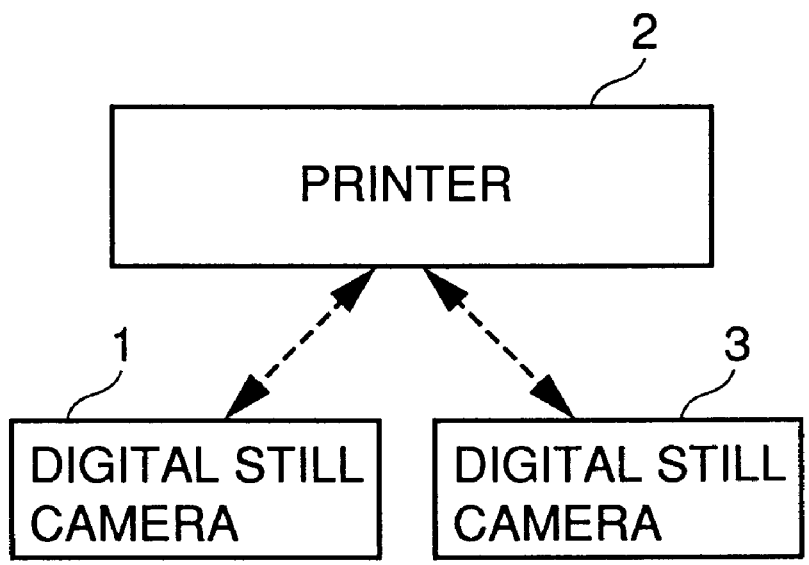
FIG. 5 is a diagram exemplifying a printing system in accordance with the second embodiment of the present invention.

Referring to FIG. 5, a printing system according to the present embodiment includes a printer 2 and digital still cameras 1 and 3. Printer 2 has a similar structure as that of printer 2 according to the first embodiment which has been described with reference to FIG. 1. Therefore, the description thereof will not be repeated. Digital still cameras 1 and 3 have a similar structure as that of digital still camera 1 according to the first embodiment which has been described with reference to FIG. 1. Therefore, the description thereof will not be repeated. Digital still cameras 1 and 3 perform infrared communication with printer 2.

Figure 6:
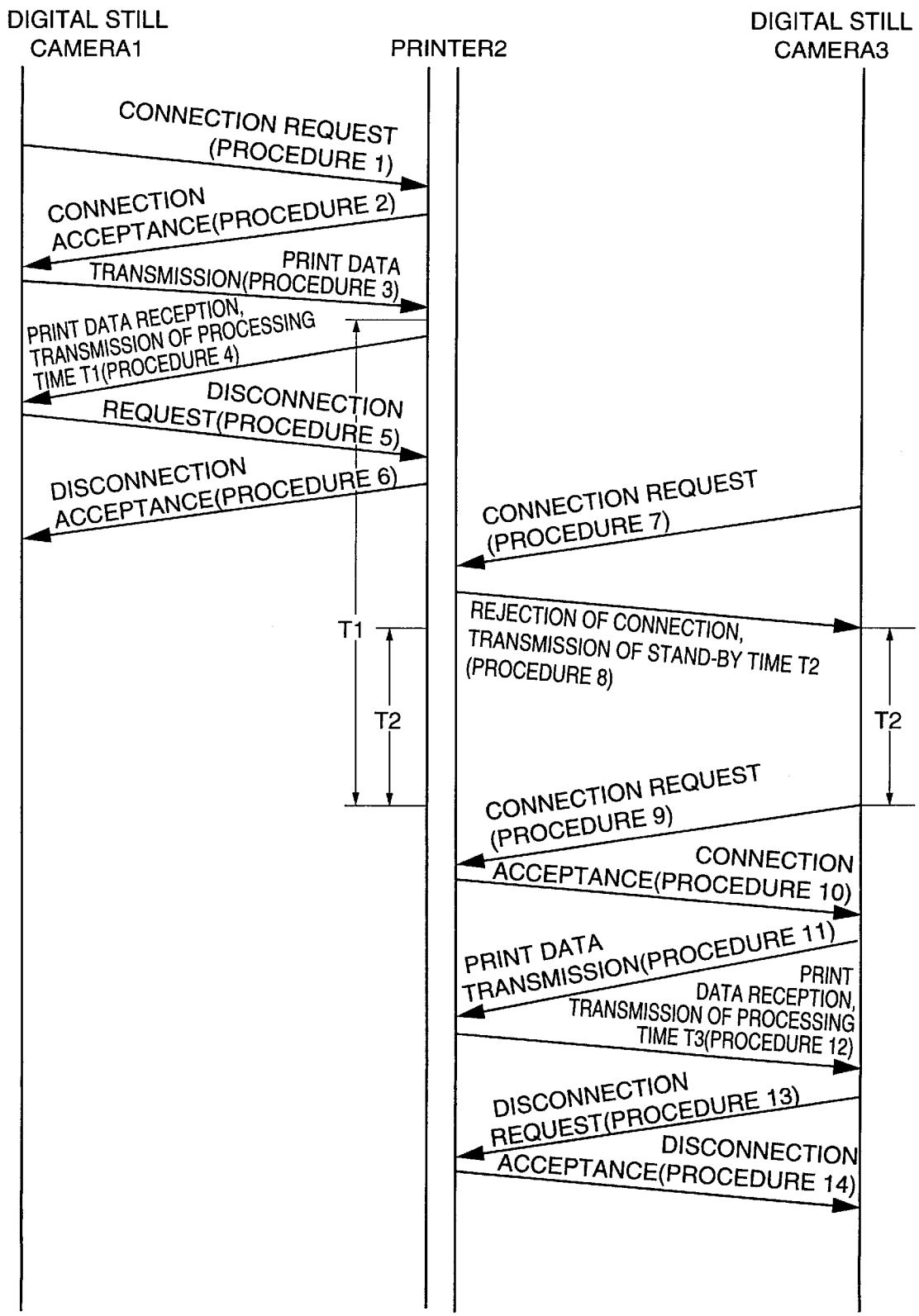
FIG. 6 is a diagram showing a procedure for radiocommunication in accordance with the second embodiment of the present invention.

Referring to FIG. 6, an infrared communication means when digital still camera 1 has transmitted print data to printer 2 and digital still camera 3 transmits print data to printer 2 while printer 2 is performing printout processing will be described. It is noted that if digital still camera 3 transmits data when digital still camera 1 is in the process of transmitting print data to printer 2, both of digital still cameras 1 and 3 would fail in communication processing. Therefore, assume that digital still camera 3 would not transmit data when digital still camera 1 is in the process of transmitting print data to printer 2.

Procedures of transmitting printout data to printer 2 from digital still camera 1 are similar to procedures 1 to 4 and 8 to 9 in the first embodiment (procedures 1 to 6). Therefore, the description thereof will not be repeated.

Then, while printer 2 is performing printout by a request from digital still camera 1, that is, during a period of time T1, digital still camera 3 transmits a connection request protocol to printer 2 (procedure 7). Period of time T1 is determined in accordance with a size, the number of colors or the like of the remaining print data which is still retained in printer 2 and has not been printed out.

Printer 2 cannot perform another printout processing at the time. Thus, printer 2 transmits a connection rejection protocol to digital still camera 3. At the same time, printer 2 calculates a stand-by time T2 which is a period of time it takes before the current printout processing is completed in a similar manner as in the case of period of time T1, and includes the value of T2 in the connection rejection protocol (procedure 8).

Digital still camera 3 which has received the connection rejection protocol reads out stand-by time T2 therefrom and again transmits the connection request protocol to printer 2 after T2 is elapsed (procedure 9).

At the time, as printer 2 has completed the previous processing, it transmits a connection permission protocol to digital still camera 3 (procedure 10).

Then, transmission of data and disconnection processing are performed in similar procedures as procedures 3, 4, 5 and 6 (procedures 11, 12, 13, 14).

Figure 7:
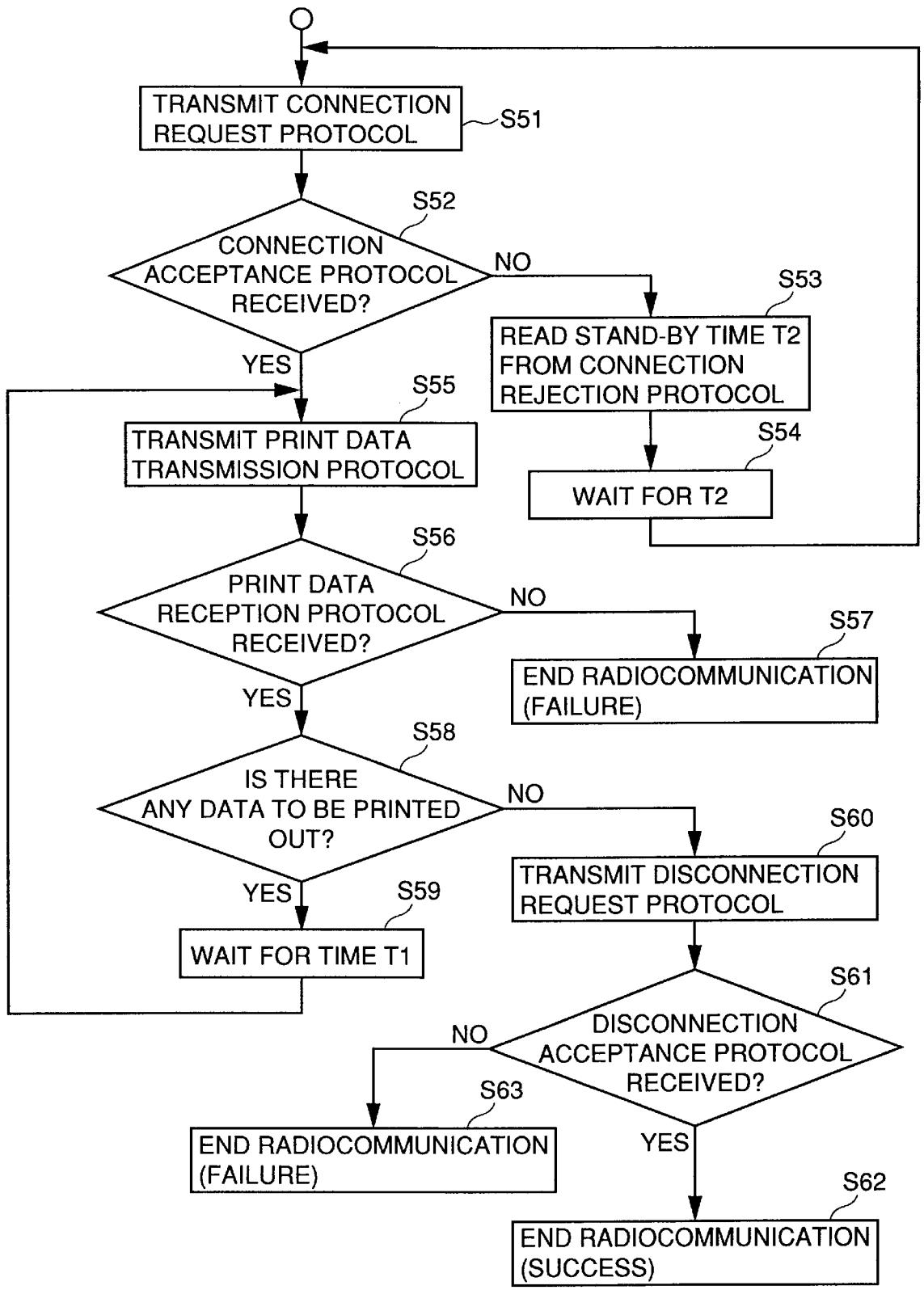
FIG. 7 is a flow chart corresponding to a portion related to radiocommunication in a program for controlling digital still cameras 1 and 3 in accordance with the second embodiment of the present invention.

Referring to FIG. 7, a portion related to radiocommunication in a program for controlling digital still camera 1 will be described. It is noted that a similar processing is performed also in digital still camera 3, and therefore the description thereof will not be repeated.

Digital still camera 1 transmits the connection request protocol to printer 2 (S51). Digital still camera 1 receives data and determines if the received data is a connection acceptance protocol (S52). If data other than the connection acceptance protocol has been received (NO in S52), digital still camera 1 reads out stand-by time T2 from the connection rejection protocol as the received data is the connection rejection protocol (S53). Digital still camera 1 returns to S51 after stand-by time T2 is elapsed (S54).

If the received data is the connection acceptance protocol (YES in S52), digital still camera 1 transmits image data as a print data transmission protocol (S55). Digital still camera 1 determines if the print data reception protocol has been received (S56). If the received data is not the print data reception protocol or no data has been received for a prescribed period of time (NO in S56), digital still camera 1 notifies a user of the failure of transmission of the print data through a user interface portion 15 and ends radiocommunication (S57).

If the received data is the print data reception protocol (YES in S56), digital still camera 1 determines if there is any data to be printed out (S58). If there is any data to be printed out (YES in S58), digital still camera 1 returns to S55 after time T1 included in the print data reception protocol is elapsed.

If there is not any data to be printed out (NO in S58), digital still camera 1 transmits the disconnection acceptance protocol to printer 2 (S60). Digital still camera 1 determines if the disconnection acceptance protocol has been received (S61). If the received data is the disconnection acceptance protocol (YES in S61), digital still camera 1 notifies the user of the success of transmission of every data and disconnection processing through user interface portion 15 and ends radiocommunication (S62).

If the received data is not the disconnection acceptance protocol or no data has been received for a prescribed period of time (NO in S61), digital still camera 1 notifies the user of the failure of the disconnection processing through use interface portion 15 and ends radiocommunication (S63).

In the procedure hereinbefore, digital still camera 1 can automatically transmit data corresponding to a plurality of pages sequentially even when another digital still camera 3 is provided in the same system.

Figure 8:
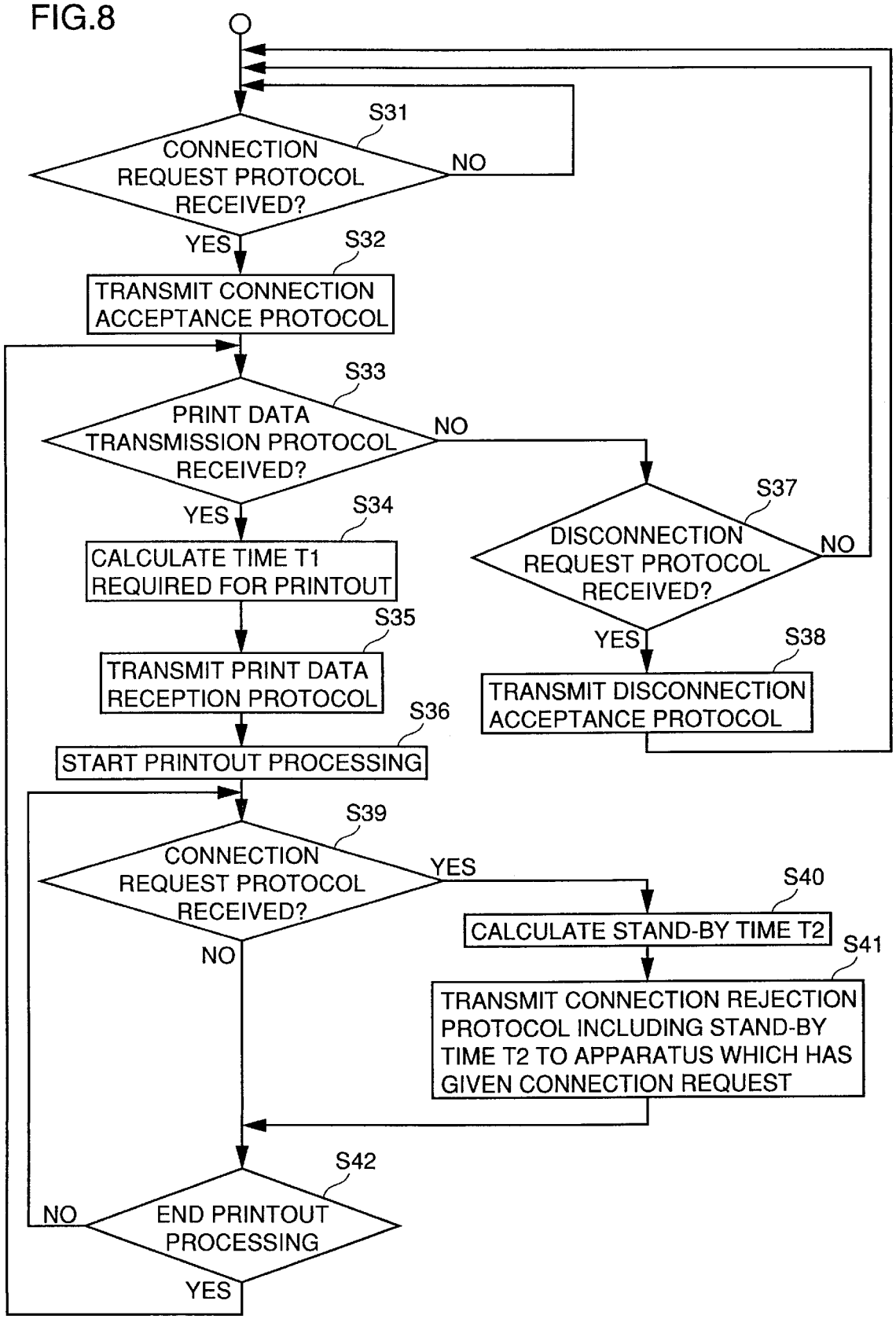
FIG. 8 is a flow chart corresponding to a portion related to radiocommunication in a program for controlling a printer in accordance with the second embodiment of the present invention.

Referring to FIG. 8, a portion related to radiocommunication in a program for controlling printer 2 will be described.

Printer 2 determines if the connection request protocol has been received (S31). If the received data is other than the connection request protocol or no data has been received for a prescribed period of time (NO in S31), printer 2 returns to S31 and again determines if the connection request protocol has been received.

If the received data is the connection request protocol (YES in S31), printer 2 transmits the connection acceptance protocol to digital still camera 1 (S32).

Printer 2 receives data and determines if the received data is the print data transmission protocol (S33). If the received data is not the print data transmission protocol (NO in S33), printer 2 determines if the data is the disconnection request protocol (S37). If the data is not the disconnection request protocol (NO in S37), printer 2 returns to S31. If the data is the disconnection request protocol (YES in S37), printer 2 transmits the disconnection acceptance protocol to digital still camera 1 (S38). Thereafter, the process returns to S31.

If the data received in S33 is the print data transmission protocol (YES in S33), printer 2 calculates a time T1 required for printing out the data received in S33 (S34).

Printer 2 transmits the print data reception protocol to digital still camera 1 (S35). At the time, a value of time T1 is included in the print data reception protocol.

Printer 2 starts now the printout processing (S36). Printer 2 determines if the connection request protocol has been received (S39). If the connection request protocol has been received (YES in S39), printer 2 calculates a time (a stand-by time) T2 before the current printout processing is completed (S40). Stand-by time T2 is calculated in accordance with the size, the number of colors or the like of the remaining print data which is still retained in printer 2 and not printed out. Printer 2 transmits the connection rejection protocol including stand-by time T2 to digital still camera 1 which has transmitted the connection request protocol (S41). If the connection request protocol has not been received (NO in S39), or when the process in S41 is completed, printer 2 determines if the printout processing is completed (S42). If the printout processing is not completed (NO in S42), printer 2 returns to S39 and again determines if the connection request protocol has been received (S39). If the printout processing is completed (YES in S42), printer 2 returns to S33 and determines if the print data transmission protocol has been received.

By using the printing system according to the present embodiment, even when printout requests are given to one printer 2 from a plurality of digital still cameras 1 and 3, completion of printout is notified to each of the plurality of digital cameras 1 and 3. Thus, each of digital still cameras 1 and 3 can automatically transmit a plurality of data successively without any need for being kept in the status of reception or transmitting data for inquiry in order to inquire about the status of printer 2. Therefore, reduction in power consumption of digital still cameras 1 and 3 can be achieved.

Third Embodiment

Figure 9:
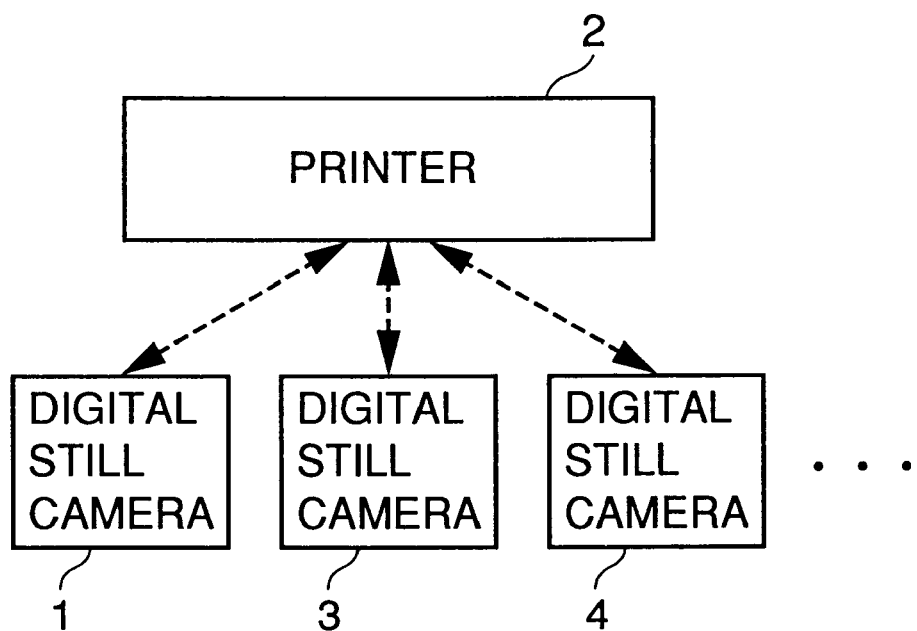
FIG. 9 is a diagram exemplifying a printing system in accordance with the third embodiment of the present invention.

Referring to FIG. 9, a system according to a third embodiment of the present invention includes a printer 2, and digital still cameras 1, 3 and 4. Printer 2 has a similar structure as that of printer 2 according to the first embodiment which has been described with reference to FIG. 1. Therefore, the description thereof will not be repeated. Digital still cameras 1, 3 and 4 have similar structures as that of digital still camera 1 according to the first embodiment which has been described with reference to FIG. 1. Therefore, the description thereof will not be repeated. While only three digital still cameras are provided in the system, four or more digital still cameras can be provided.

Figure 10:
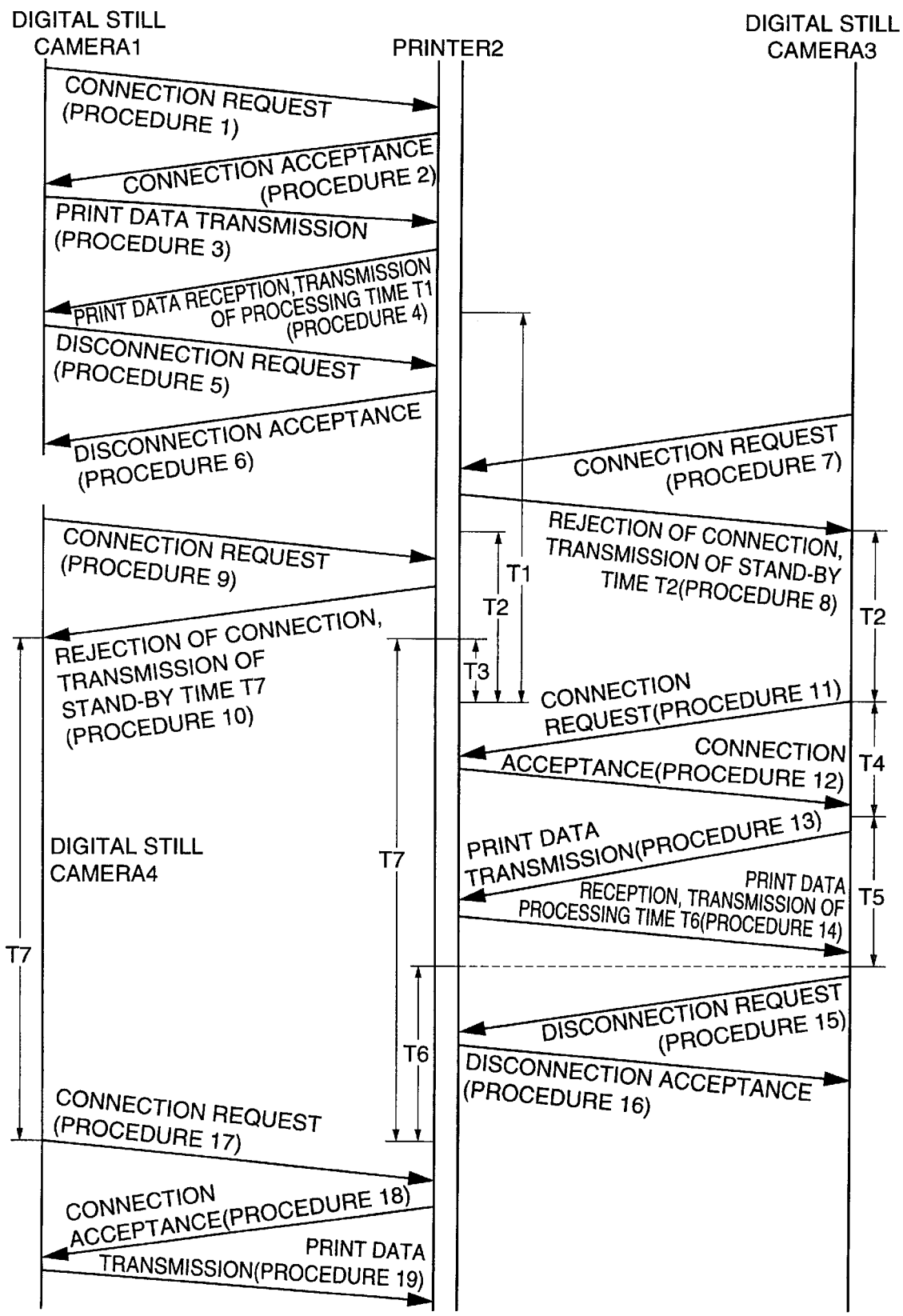
FIG. 10 is a diagram showing a procedure for radiocommunication in accordance with the third embodiment of the present invention.

Referring to FIG. 10, a radiocommunication means between digital still cameras 1, 3, 4 and printer 2 in the following situation will be described. Digital still camera 1 has transmitted print data to printer 2. Digital still camera 3 is to transmit print data to printer 2 while printer 2 is in the process of printing out print data transmitted from digital still camera 1. Digital still camera 3 is rejected by printer 2 for connection. While digital still camera 3 waits until printer 2 becomes ready to use, digital still camera 4 gives a request for connection to printer 2.

First, digital still camera 1 transmits a connection request protocol to printer 2. At the time, in the connection request protocol, an apparatus identifier which is a unique identifier allowing identification of the apparatus from other apparatuses and information on the size, the number of colors of data to be printed out, the paper size or the like are included in addition to information on a communication speed, communication buffer size, image size, paper size, the number of colors or the like corresponding to each apparatus (procedure 1).

If printer 2 is ready to process, a connection acceptance protocol is transmitted to digital still camera 1. At the time, printer 2 stores the apparatus identifier, connection information and printout data information which are transmitted from digital still camera 1 on an RAM 13 (procedure 2).

FIG. 11 is a diagram exemplifying a data structure of a control table 40 for storing the information.

Procedures from transmission of print data by digital still camera 1 to printer 2 to disconnection of communication are the same as procedures 3, 4, 5 and 6 in the second embodiment (procedures 3, 4, 5, 6). Therefore, the description thereof will not be repeated.

Thereafter, digital still camera 3 transmits a request for printout to printer 2 (procedure 7).

As printer 2 cannot perform another printout processing at the time, it transmits a connection rejection protocol. At the time, printer 2 calculates a stand-by time T2 which is a period of time it takes before the current printout processing is completed by predicting a time at which the printout would be completed in accordance with the size, the number of colors or the like of print data which is still retained in printer 2 and not printed out. Further, printer 2 includes the value of T2 in the connection rejection protocol. In addition, the apparatus identifier, connection information and the printout data information included in the connection request protocol from digital still camera 3 are stored in control table 40 of printer 2 (procedure 8).

Digital still camera 3 which has received the connection rejection protocol reads stand-by time T2 out of the connection rejection protocol and wait until time T2 is elapsed.

Then, while printer 2 is performing printout by a request from digital still camera 1, that is, during stand-by time T2, digital still camera 4 transmits the connection request protocol to printer 2 (procedure 9).

As printer 2 cannot perform another printout processing at the time, it transmits the connection rejection protocol. At the time, a stand-by time T7 corresponding to a period of time it takes before the current printout processing is completed is calculated and the value of T7 is included in the connection rejection protocol. Stand-by time T7 can be calculated in control table 40 of printer 2 by adding a period of time it takes before the current printout processing is completed, a period of time required for transmitting and processing the connection request protocol, the connection acceptance protocol, and the printout data transmission protocol associated with printout currently in the stand-by status and a period of time required for printout.

In the case of the example shown in FIG. 10, a period of time T7 for which a digital still camera 4 should be kept in the stand-by status equals to a sum of a period of time T3 it takes before digital still camera 1 which is currently printing completes printout, a period of time T4 it takes before the connection request from digital still camera 3 is accepted, a period of time T5 necessary for digital still camera 3 to transmit print data and a period of time T6 required for printing out the data. These periods of time can immediately be calculated as parameters therefor are all recorded in control table 40 of printer 2 (procedure 10).

Then, after each of digital still cameras 3 and 4 waited for periods of time T3 and T7, respectively, connection for communication is established. The procedures for transmitting printout data are similar to procedures 9 to 14 of the second embodiment which has been described with reference to FIG. 6 (procedures 11 to 19). Therefore, the description thereof will not be repeated.

Portions related to radiocommunication in programs for controlling digital still cameras 1, 3 and 4 are similar to those in programs for digital still cameras 1 and 3 according to the second embodiment which has been described with reference to FIG. 7. Therefore, the description thereof will not be repeated.

Referring to FIG. 12, a portion related to radiocommunication in a program for controlling printer 2 will be described.

Processes in S71 to S75 and S78 to S79 are similar to those in S31 to S35 of the second embodiment which has been described with reference to FIG. 8. Therefore, the description thereof will not be repeated.

After the process in S75, printer 2 registers information associated with printing including a time required for printout in control table 40 (S76). Printer 2 starts printout processing (S77). Printer 2 determines if a connection request protocol has been received (S80). If the connection request protocol has been received (YES in S80), printer 2 calculates period of time (stand-by time) T7 it takes before the current printout processing and the printout processing in the stand-by status are completed (S82). Stand-by time T7 is calculated as described above. Printer 2 transmits a connection rejection protocol including stand-by time T7 to digital still camera 1 which has transmitted the connection request protocol (S82).

If the connection request protocol has not been received (NO in S80), or when the process in S82 is completed, printer 2 determines if the current printout processing has been completed (S83). If the current printout processing has not been completed (NO in S83), printer 2 returns to S80 and again determines if the connection request protocol has been received. If the current printout processing has been completed (YES in S83), printer 2 eliminates information on printout which is related to the current printout processing from control table 40 (S84). In other words, it is recorded that the current printout processing has been completed. Thereafter, printer 2 returns to S73 and determines if a print data transmission protocol has been received.

It is noted that the above control program for printer 2 has been described only in connection with the communication process with digital still camera 1. However, communication processes with digital still cameras 3 and 4 are also performed in accordance with similar procedures.

In the printing system according to the present embodiment, requests for printout are given to one printer 2 from a plurality of digital still cameras 1, 3 and 4 approximately at the same time and, if the connection is rejected, a period of time it takes before each apparatus becomes ready to be connected to printer 2 is notified to the apparatus. In other words, printer 2 transmits each of the apparatuses a period of time obtained by adding a period of time it takes before the current printout processing is completed and that before the printout processing in the stand-by status is completed in accordance with the information on printout which is stored in control table 40. Thus, a time at which the printout processing is completed is notified to each of digital still cameras 1, 3 and 4 without any need for frequently inquiring printer 2 or being kept in the status of reception for radiocommunication. Therefore, a plurality of pages are automatically printed out while reducing power consumption of digital still cameras 1, 3 and 4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print control method performed between print data transmission means for transmitting print data and image formation means receiving said print data for image forming in accordance with said print data both connected by wireless communication, comprising the steps of:

(a) transmitting a request to transmit said print data to said image formation means by said print data transmission means;

(b) receiving the request transmitted in step (a) by said image formation means;

(c) calculating a first period of time it takes before it becomes ready to receive said print data by said image formation means;

(d) transmitting a response to the request transmitted in step (a) to said print data transmission means by said image formation means, the response including a notification of said first period of time calculated in step (c);

(e) receiving the response transmitted in step (d) by said print data transmission means;

(f) determining if said first period of time is elapsed by said print data transmission means; and (g) transmitting said print data to said image formation means by said print data transmission means when said first period of time is elapsed, thereby allowing said print data transmission means to transmit said print data to said image formation means without being kept in a status of reception or transmit data for inquiry so as to inquire about a status of said image formation means.

2. The print control method according to claim 1, wherein said step of calculating said first period of time includes the step of calculating a period of time it takes before said image formation means completes image formation in accordance with said print data received from said print data transmission means.

3. The print control method according to claim 1, wherein said step of calculating said first period of time includes the step of calculating a period of time it takes before said image formation means completes image formation for said print data currently in a process of image formation.

4. The print control method according to claim 1, further comprising the step of storing information on said print data for which image formation has not been completed of said print data received from said print data transmission means by said image formation means, said step of calculating said first period of time including the step of calculating a period of time it takes before all of image formation processes for said print data for which the image formation has not been completed are completed in accordance with said information on said print data for which the image formation has not been completed.

5. A print control method performed between an information apparatus for transmitting print data and a printer receiving said print data for image forming in accordance with said print data both connected by wireless communication, comprising the steps of:

(a) transmitting a request to transmit said print data to said printer by said information apparatus;

(b) receiving the request transmitted in step (a) by said printer;

(c) calculating a first period of time it takes before it becomes ready to receive said print data by said printer;

(d) transmitting a response to the request transmitted in step (a) to said information apparatus by said printer, the response including a notification of said first period of time calculated in step (c);

(e) receiving the response transmitted in step (d) by said information apparatus;

(f) determining if said first period of time is elapsed by said information apparatus; and (g) transmitting said print data to said printer by said information apparatus when said first period of time is elapsed, thereby allowing said information apparatus to transmit said print data to said printer without being kept in a status of reception or transmit data for inquiry so as to inquire about a status of said printer.

6. The print control method according to claim 5, wherein said information apparatus is a digital still camera.

7. The print control method according to claim 5, wherein said step of calculating said first period of time includes the step of calculating a period of time it takes before said printer completes image formation in accordance with said print data received from said information apparatus.

8. The print control method according to claim 7, wherein said information apparatus is a digital still camera.

9. The print control method according to claim 5, wherein said step of calculating said first period of time includes the step of calculating a period of time it takes before said printer completes image formation for said print data currently in a process of image formation.

10. The print control method according to claim 9, wherein said information apparatus is a digital still camera.

11. The print control method according to claim 5, further comprising the step of storing information on said print data for which image formation has not been completed of said print data received from said information apparatus by said printer, said step of calculating said first period of time including the step of calculating a period of time it takes before all of image formation processes for said print data for which the image formation has not been completed are completed in accordance with said information on said print data for which the image formation has not been completed.

12. The print control method according to claim 11, wherein said information apparatus is a digital still camera.

13. A printing system, comprising print data transmission means for transmitting print data by wireless communication, and image formation means receiving said print data by the wireless communication for image forming in accordance with said print data, said image formation means including, means for receiving a request to transmit said print data from said print data transmission means, time calculating means for calculating a first period of time it takes before it becomes ready to receive said print data, and means for transmitting a response to the request to transmit said print data to said print data transmission means, the response including a notification said first period of time, and said print data transmission means including means for transmitting the request to transmit said print data to said image formation means, means for receiving the response to the request to transmit said print data from said image formation means, means for determining if said first period of time is elapsed, and means for transmitting said print data to said image formation means when said first period of time is elapsed.

14. The printing system according to claim 13, wherein said time calculating means includes means for calculating a period of time it takes before image formation is completed in accordance with said print data received from said print data transmission means.

15. The printing system according to claim 13, wherein said time calculating means includes means for calculating a period of time it takes before image formation for said print data currently in a process of image forming is completed.

16. The printing system according to claim 13, wherein said image formation means further includes means for storing information on said print data for which image formation has not been completed of said print data received from said print data transmission means, and said time calculating means includes means for calculating a period of time it takes before all of image formation processes for said print data for which the image formation has not been completed are completed in accordance with said information on said print data for which the image formation has not been completed.

17. A printing system, comprising an information apparatus for transmitting print data by wireless communication, and a printer receiving said print data by the wireless communication for image forming in accordance with said print data, said printer including means for receiving a request to transmit said print data from said information apparatus, time calculating means for calculating a first period of time it takes before it becomes ready to receive said print data, and means for transmitting a response to the request to transmit said print data to said information apparatus, the response including a notification of said first period of time, and said information apparatus including means for transmitting the request to transmit said print data to said printer, means for receiving the response to the request to transmit said print data from said printer, means for determining if said first period of time is elapsed, and means for transmitting said print data to said printer when said first period of time is elapsed.

18. The printing system according to claim 17, wherein said information apparatus is a digital still camera.

19. The printing system according to claim 17, wherein said time calculating means includes means for calculating a period of time it takes before image formation is completed in accordance with said print data received from said information apparatus.

20. The printing system according to claim 19, wherein said information apparatus is a digital still camera.

21. The printing system according to claim 17, wherein said time calculating means includes means for calculating a period of time it takes before image formation for said print data currently in a process of image forming is completed.

22. The printing system according to claim 21, wherein said information apparatus is a digital still camera.

23. The printing system according to claim 17, wherein said printer further includes means for storing information on said print data for which image formation has not been completed of said print data received from said information apparatus, and said time calculating means includes means for calculating a period of time it takes before all of image formation processes for said print data for which the image formation has not been completed are completed in accordance with said information on said print data for which the image formation has not been completed.

24. The printing system according to claim 23, wherein said information apparatus is a digital still camera.

* * * * *